June 18, 1946.   C. L. EKSERGIAN ET AL   2,402,386
BRAKE MECHANISM
Filed April 6, 1944   2 Sheets-Sheet 1
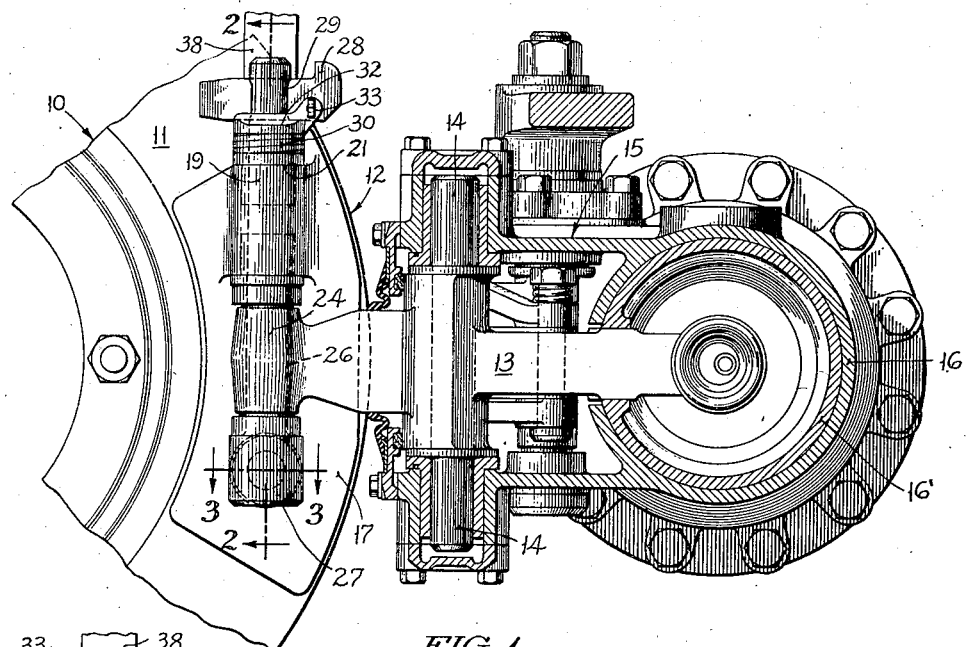
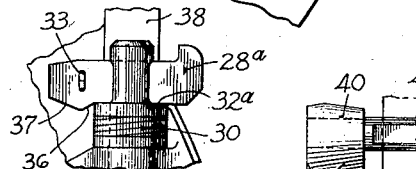
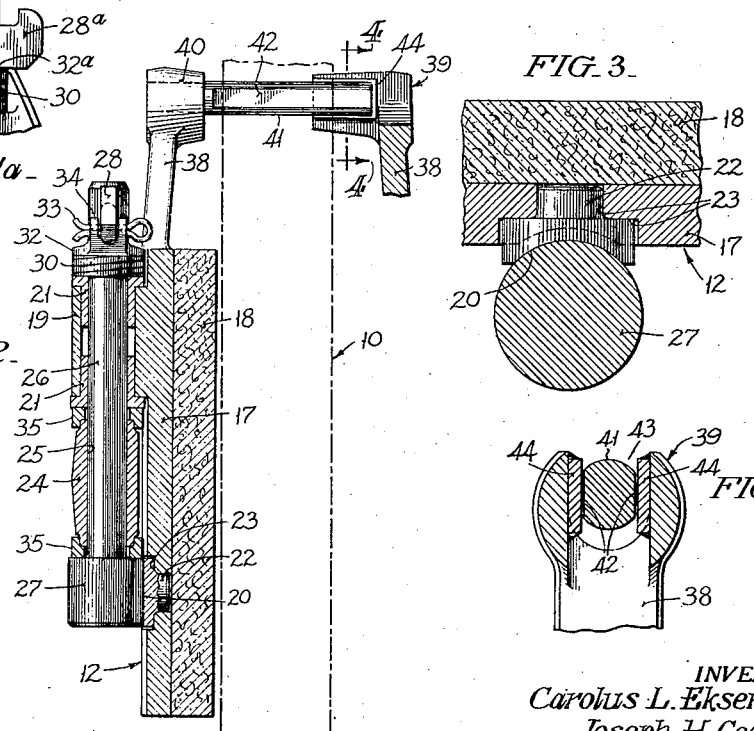
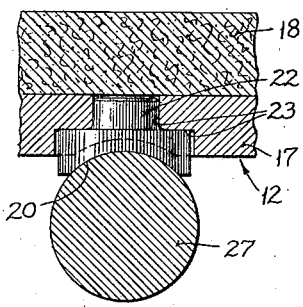
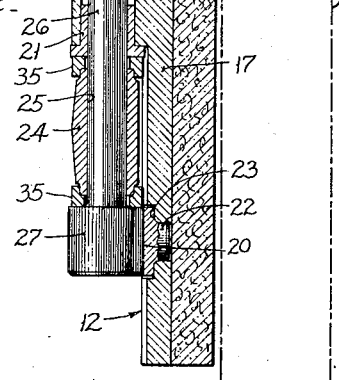
INVENTORS
Carolus L. Eksergian
Joseph H. Coombes
Paul W. Gaenssle
BY
John P. Tarbox
ATTORNEY

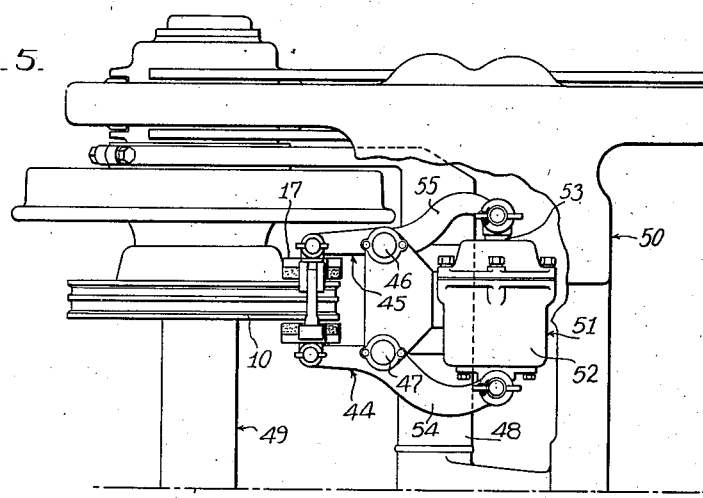
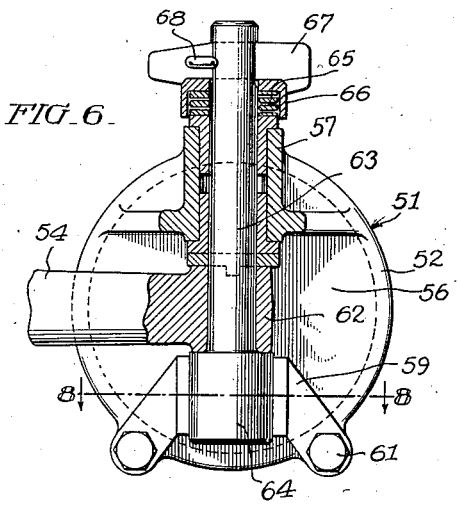
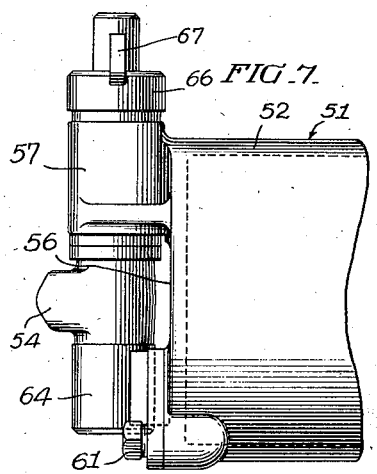
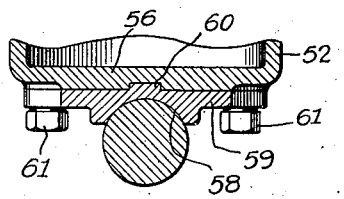
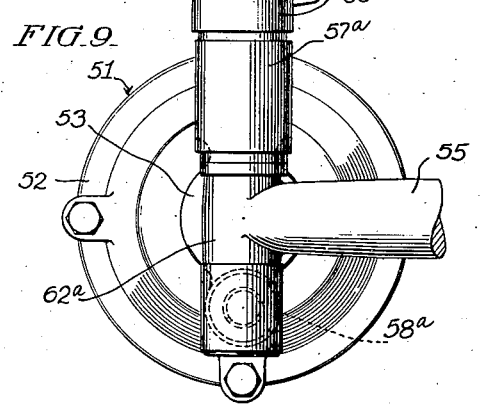

Patented June 18, 1946

2,402,386

UNITED STATES PATENT OFFICE 2,402,386

BRAKE MECHANISM

Carolus L. Eksergian, Joseph H. Coombes, and Paul W. Gaenssle, Detroit, Mich., assignors to Budd Wheel Company, Philadelphia, Pa., a corporation of Pennsylvania Application April 6, 1944, Serial No. 529,730

14 Claims. (Cl. 188—205)

1

This application is a continuation-in-part of application Serial No. 503,206, filed September 21, 1943, and abandoned August 21, 1944.

The invention relates to brake mechanism and particularly to improved means for mounting the brake shoes and cylinder actuators, or the like, on associated parts of such mechanism.

It is a principal object of the invention to simplify the mounting and demounting of such parts with their associated parts and to facilitate the assembly and disassembly thereof.

Other and further objects and advantages and the manner in which they are attained will become clear from the following detailed description when read in connection with the drawings forming a part of this specification.

In the drawings:

Fig. 1 is a fragmentary part-sectional, part-elevational view through a brake mechanism showing one form of the invention applied thereto;

Fig. 1a is a fragmentary view of a portion of a mechanism similar to Fig. 1 showing a slight modification;

Fig. 2 is a fragmentary sectional view taken substantially on the line 2—2 of Fig. 1, parts being shown in elevation;

Fig. 3 is a similar view, on an enlarged scale, taken substantially on the line 3—3 of Fig. 1;

Fig. 4 is an enlarged fragmentary elevational view taken substantially on the line 4—4 of Fig. 2;

Fig. 5 is a plan view of one-quarter of a railway truck showing the invention applied to the brake mechanism thereof, the cylinder actuator being in this modification shown readily demountably secured to the associated brake levers;

Fig. 6 is an enlarged detail sectional view showing the invention applied to the mounting of the cylinder to the associated lever;

Fig. 7 is a fragmentary side elevational view corresponding to the showing of Fig. 6;

Fig. 8 is a detail sectional view, the section being taken substantially along the line 8—8 of Fig. 6; and Fig. 9 is an end elevational view showing the invention applied to the connection between the piston and associated brake lever.

In the drawings the invention has been shown applied to a radial brake, generally similar to that disclosed in copending application Serial No. 399,779 filed June 26, 1941, for Brake mechanism but it will be understood that in its broader aspects, it is equally applicable to other types of brake mechanisms.

In a radial brake of this class, the rotary brake

2 member, as 10, shown in full lines in Fig. 1 and in dot and dash lines in Fig. 2, has its radial brake faces, as 11, normally rotating between spaced segmental shoes, as 12, each shoe being pivotally supported by an actuating lever, as 13, pivoted at 14, in a brake support-casing 15, having a cylinder 16 and piston 16' for actuating the lever, the piston and cylinder being slotted to receive the lever. Since the invention, according to this form, is not concerned with the particular manner in which the actuating levers are supported and actuated, this brief description of the general arrangement is believed sufficient, and since both shoes 12 are similarly supported from their respective actuating levers 13, a description of the mounting of one will suffice.

Referring to Figs. 1 to 4, inclusive, each shoe 12 comprises a rigid metal backing 17 to the front face of which, i. e. the face toward the adjacent braking face 11 of the rotary brake member 10, is secured in any suitable manner the brake lining 18. On its back face, the metal backing carries, on an axis extending lengthwise of the shoe, spaced bearings 19 and 20. The bearing 19 is an elongated cylindrical bearing and the bearing 20 is a laterally open segmental bearing. To prolong the wear, the bearing 19 may be bushed with hardened flanged bushings 21 and the bearing 20 may be formed on a hardened stud 22 fitting a shouldered opening 23 in the metal backing 17.

The actuating lever, as 13, carries at its end connected with the shoe 12 an elongated boss 24 disposed between the spaced bearings 19 and 20 and having a vertical hole 25 aligned with the axes of the bearings. Fitting the hole 25, preferably with a press fit, is a pivot pin 26 having an enlarged diameter cylindrical head 27 whose cylindrical face seats against the face of the segmental bearing 20 provided on the hardened bearing stud 22. The body of the pin extends through the bushed bearing 19 and its upper end projects some distance therebeyond.

Easily detachable means is provided for securing the pin in place, which means may comprise a flat key 28 having a narrow tapered entering end and fitting, when driven home, a transverse slot 29 in the end of the pin 26.

This key is normally frictionally locked in place by the pressure of a short, stiff coil spring 30 surrounding the pin and bearing at its opposite ends through flanged bushing 21 and washer 32 upon the end of the bearing 19 and the key 28, respectively. This spring besides its function of frictionally locking the key in position, takes up all lost motion and prevents rattling. To lock the key positively in place, a cotter pin, as 33, may be passed through aligned holes in ears, as 34, on the washer 32 and the key 28.

To take the end thrust between the actuator boss 24 and the head 27 of the pin 26 and the elongated bearing 19, respectively, hardened thrust washers 35 are inserted between these parts, as shown most clearly in Fig. 2.

A somewhat simplified and preferred means for detachably locking the pin 26 in place is shown in Fig. 1a. According to this arrangement, a plain flat washer 32a may be utilized and the locking key 28a is provided with a cam face 36 sloping reversely to the entering cam face 37. When the key is driven home, as shown in Fig. 1a, the cam face 36 normally prevents the release of the key, since the pressure of the spring 30 coacts with it to oppose such release. For added safety, even with this relatively secure lock of the key, the key may be further secured in place by passing a cotter pin 33 through a hole therein.

With either form of lock, it will be seen that the key can be readily secured by first withdrawing the cotter pin 33 and then driving the key from the slot, the incline of the cam face 36 in the form of Fig. 1a readily permitting this if the key is struck a sharp blow with a hammer. After the key is removed the shoe 12 can be lifted up, the bearing 19 readily sliding off the pin 26 in this operation.

Ordinarily, it is desirable to hold the two shoes 12 on opposite sides of the rotary brake member 10 substantially parallel to each other and to the braking faces 11 on member 10, so as to avoid wear of the lining when the shoes are in inoperative position, and to insure the substantially simultaneous engagement of the entire face of each shoe lining with its respective braking face when the brakes are applied.

This advantage is attained by the present invention without interference with the ready removal or replacement of one shoe while the other is in place. Figs. 2 and 4 show how this is accomplished.

Each of the two shoes 12 flanking the rotary braking member 10, is provided with an upward extension 38, the ends of these extensions projecting beyond the outer periphery of the rotary member 10 and being there formed with bosses 39 and 40, respectively, for the right and left shoes as shown in Fig. 2.

In the boss 40 is rigidly secured a guide pin 41 having flattened sides 42, and the end of this pin projects into a vertically open slot 43 formed in the elongated boss 39. To minimize wear the sides of this slot may be lined with hardened metal bearing plates 44 welded in place as shown in Fig. 4.

The length of the pin 41 and the transverse extent of the top and bottom opening slot 43 are such that either shoe can be vertically removed in the manner already described without disturbing the other, when the brakes are in the released position.

In the modifications shown in Figs. 5 to 10, inclusive, the invention is shown applied to the type of brake mechanism generally similar to that shown in copending application, Serial No. 520,211, filed January 29, 1944, and issued as Patent No. 2,382,552 on Aug. 14, 1945, in which the cylinder actuator is floatingly mounted between the brake actuating levers and the cylinder and piston thereof are pivotally mounted on the respective actuating or brake levers by means similar to the mounting of the shoes described in connection with the preferred form.

Referring now to Figs. 5 to 10, the rotary brake disc is designated by 10, the brake shoes cooperating therewith by 17, these shoes being pivotally carried by actuating or brake levers 44 and 45, this pivotal mounting preferably corresponding to that shown in Figs. 1 to 4. The respective levers are mounted intermediate their ends on pivots 47 and 46, respectively, on a brake support 48 which may be supported in a usual manner from the wheel and axle assembly 49 and the truck frame 50. The cylinder actuator, designated generally by 51, and comprising the cylinder 52 and piston having a rod 53 extending through an end wall of the cylinder, through a suitable packing (not shown), is pivotally and floatingly supported between the arms 54 and 55, respectively, of the brake levers 44 and 45, which arms extend from the pivots in a direction opposite from that of the arms supporting the shoes.

The arm 54 is readily removably mounted on the closed end 56 of the cylinder 52 by means very similar to the mounting of the brake shoe on the lever as hereinbefore described.

To this end this closed end 56 of the cylinder is formed with an annular or closed bearing 57 and an open segmental bearing 58, the latter being preferably formed in a separate bearing bracket 59 having a spline 60 fitting a corresponding slot in the end wall 56 of the cylinder and bolted thereto by the bolts 61.

The arm 54 of the associated brake lever 44 carries at its end connected with the cylinder an elongated boss 62 disposed between the spaced bearings 57 and 58 and has a vertical hole aligned with the axes of the bearings. Fitting this hole, preferably with a press fit, is a pivot pin 63 having an enlarged diameter cylindrical head 64 whose cylindrical face seats against the face of the segmental bearing 58. The body of the pin extends through the bushed bearing 57 and its upper end projects some distance therebeyond and is yieldingly and readily releasably held in place in a manner similar to the mounting of the shoe by a coil spring 65, a cup washer 66, and a key 67 extending through a slot in the projecting end of the pin, which key normally holds the spring compressed and is in turn frictionally held in place by the pressure of the spring. To positively lock it in place, a cotter pin 68 may be extended through a hole in the key.

Similarly, and as shown in Fig. 9, the piston, through its rod 53, carries spaced bearings 57a and 58a in which is mounted the pin 63 press fitted into boss 62a formed in the end of its associated lever arm 55, and the pin is locked in place by means similar to that shown in Figs. 6 and 7.

When the cylinder actuator is being assembled with the lever arms 54 and 55 its cylinder and piston are dropped down over the pins 63 associated with the respective lever arms, the coil springs 65 and cup washers 66 are then slipped over the upper ends of the pins, and the keys 67 are then inserted. To disassemble the cylinder actuator, the reverse procedure is adopted. It will be seen that a cylinder actuator can in this way be readily removed and replaced by another whenever desired.

From the foregoing description, it will be seen that a very simple means has been provided for mounting the shoes and/or the cylinder actuator on the actuator or brake levers and one which permits the ready removal of the individual shoe even where two shoes are connected together to maintain them in parallelism and similarly permits the ready replacement of a cylinder actuator.

While the specific structure shown and described is a very practical one, it will be understood that changes and modifications may be made by those skilled in the art which utilize the main features of the invention, and it is intended that such changes and modifications as fall within the scope of the appended claims redound to the benefit of the inventors herein.

What is claimed is:

1. In a brake mechanism, an actuating lever, and a member readily demountably pivoted to said actuating lever, said demountable pivot means comprising a bearing pin rigidly secured to the actuating lever and projecting from the opposite sides thereof, said bearing pin having a head at one side of the actuating lever supporting the member laterally and a bearing on said member at the other side of said actuating lever through which the pin is adapted to pass, means resiliently pressing the head of the pin against the actuating lever, and readily removable means for holding said resilient means compressed and maintaining said member in assembled relation with the actuating lever.

2. In a brake mechanism, an actuating member, another member demountably pivoted to said actuating member, said demountable pivot means comprising spaced bearings on said other member, one being an open bearing and the other a closed bearing, and a mounting pin rigidly secured to a portion of said actuating member extending between said bearings and having an enlargement seated in the open bearing, and a reduced body portion extending through the closed bearing, and readily detachable means for holding the pin in place.

3. In a brake mechanism, a brake shoe having a radial braking face and means on the side of the shoe opposite said braking face for supporting it and moving it to and from braking position, said means comprising spaced bearings on the shoe, one an open bearing and the other a closed bearing, said supporting and moving means having a part pivotally engaging the open bearing and another part extending through and pivotally engaging the closed bearing, and readily detachable means for maintaining the engagement between the supporting and moving means and the shoe.

4. In a brake mechanism, a rotating member to be braked having radial braking faces, a pair of segmental brake shoes disposed adjacent the respective faces for coaction therewith, actuating members pivotally connected to the respective shoes, said pivotal connections being readily released to permit endwise movement of the shoes to disengage them from the respective actuators, and means extending between the shoes for holding them in parallel relation, said means permitting endwise movement of either one of said shoes for assembly or disassembly while the other shoe is mounted in place.

5. In a brake mechanism, an actuator, and a member pivotally mounted thereon for removal therefrom in the direction of its pivot, said mounting comprising a segmental bearing and an annular bearing spaced therefrom and both carried by one of said actuator and member, the other carrying a portion disposed between the bearings, an enlarged portion seating in said segmental bearing and a reduced portion extending through said annular bearing and having its end projecting therebeyond, and quick detachable means associated with said end to hold the parts in assembled relation.

6. A brake mechanism according to claim 5 in which the end projecting beyond the annular bearing is surrounded by a spring normally compressed between abutment means engaging, respectively, the end of the annular bearing and said quick detachable means.

7. A brake mechanism according to claim 5, in which the quick detachable means comprises a key extending through a slot in the end of the part projecting beyond the annular bearing and yielding means for securing the key in place, together with positive means preventing withdrawal of the key.

8. In a brake mechanism, an actuator, and a member pivotally mounted thereon for removal therefrom in the direction of its pivot, one of said actuator and member carrying axially aligned spaced bearings, one a segmental bearing and the other a cylindrical bearing, the other of said actuator and member carrying parts cooperating with said bearings, the part extending through the cylindrical bearing having its free end projecting therebeyond, and quick detachable means associated with said end to hold the actuator and member in assembled relation.

9. In a brake mechanism, a segmental brake shoe having aligned spaced bearings on the face thereof opposite the braking face, one of said bearings being a closed bearing and the other an open bearing, and actuating means for the shoe comprising a pivot pin engaging said bearings, the actuating means and the bearings being so related as to permit removal of the shoe by endwise movement thereof without disassociating the bearings from the shoe.

10. In a brake mechanism, a brake member having aligned spaced bearings on a face thereof opposite its working face, one of said bearings being a closed bearing and the other an open bearing, and an opposed member comprising a pivot pin engaging said bearings, said opposed member and the bearings being so related as to permit removal of the brake member by endwise movement thereof without disassociating the bearings from the brake member.

11. In a brake mechanism, an actuator, a member pivotally carried thereby but removable therefrom in the direction of its pivot, one of said actuator and member carrying axially-aligned spaced bearings of different diameters, one a segmental bearing and the other a cylindrical bearing, the other of said actuator and member carrying parts cooperating with said bearings, the part extending through the cylindrical bearing having its free end projecting therebeyond, and quick detachable means including a locking key cooperating with a slot in said extension for holding the actuator and member in assembled relation, the key having a cam face thereon and yielding means cooperating with the cam face for locking the key in place.

12. In a brake mechanism, a cylinder actuator, a lever pivotally mounted thereon for removal in the direction of its pivot, said mounting comprising a segmental bearing and an annular bearing spaced therefrom and both carried by one of said actuator and lever, the other carrying a portion disposed between the bearings, an enlarged portion seating in said segmental bearing and a reduced portion extending through said annular bearing and having its end projecting therebeyond, and quick detachable means associated with said end to hold the parts in assembled relation.

13. In a brake mechanism, an actuator piston, a member pivotally mounted thereon for removal therefrom in the direction of its pivot, said mounting comprising a segmental bearing and an annular bearing spaced therefrom and both carried by one of said piston and member, the other carrying a portion disposed between the bearings, an enlarged portion seating in said segmental bearing and a reduced portion extending through said annular bearing and having its end projecting therebeyond, and quick detachable means associated with said end to hold the parts in assembled relation.

14. In a brake mechanism, a pair of members, a cylinder actuator for said members comprising a piston and cylinder, each said cylinder and piston being pivotally mounted on a respective one of said pair of members for removal therefrom in the direction of their respective pivots, each said pivotal mounting comprising a segmental bearing and an annular bearing spaced therefrom and both carried by one of said piston or cylinder and the associated member, the other carrying a portion disposed between the bearings and a reduced portion extending through said annular bearing and having its end projecting therebeyond, and quick detachable means associated with said end to hold the parts in assembled relation.

CAROLUS L. EKSERGIAN.
JOSEPH H. COOMBES.
PAUL W. GAENSSLE.